UNITED STATES PATENT OFFICE.

GEORGE CLEVELAND HICKS, OF CHICAGO, ILLINOIS.

PAINT COMPOSITION.

1,215,022.  Specification of Letters Patent.  Patented Feb. 6, 1917.

No Drawing.  Application filed August 6, 1915.  Serial No. 44,132.

*To all whom it may concern:*

Be it known that I, GEORGE CLEVELAND HICKS, a citizen of the United States, residing at 1301 West Thirty-fifth street, Chicago, in the county of Cook and State of Illinois, have invented new and useful Improvements in Paint Compositions, of which the following is a specification.

My invention relates to improvements in paint compositions and is particularly directed to the prevention of rust on exposed iron or steel surfaces.

Numerous theories have been advanced as to the causes which lead to the rusting, corrosion, or pitting of such surfaces, and it is not my purpose to enter into any discussion of these theories, further than to point out two salient principles which my investigation leads me to believe are true. These principles are:

1. Any chemically inert substance which will form a coating or film upon the metal surface will aid in protecting the same against rust.

2. Certain classes of bodies suitable for use as pigments or fillers may be said to be harmful in that they appear to accelerate the formation of rust, while other classes of bodies may be said to be beneficial since they appear to inhibit the rusting action.

My work has accordingly been directed along these two lines, *i. e.*, the discovery of a liquid coating composition which would form the most desirable coating or film, and the discovery of a suitable filler or pigment, capable of use with such composition, and having the desired rust-inhibiting effect.

The vehicle or coating medium which I find best suited to my purposes is composed of linseed oil, either boiled or raw, but preferably boiled, and glucose, the preferred proportion by weight being $33\tfrac{1}{3}\%$ glucose (commercial), $66\tfrac{2}{3}\%$ linseed oil. The two constituents must be blended together by stirring, beating, or the like manipulation until the mixture is homogeneous, being then more or less in the form of an emulsion.

This mixture or emulsion I find to be a particularly valuable coating composition for use on iron or steel surfaces. By comparative tests I find that it forms a film or coating which appears to be in the highest degree impervious to moisture and air, durable, easy of application, not readily attacked by the commoner destructive gases found in the atmosphere, such for instance as the sulfurous fumes found in coal smoke, and greatly superior to ordinary paint compositions in its rust-preventing action. Furthermore I find that it forms a film which is peculiarly tough and elastic and retains these qualities, for several years at least, to such an extent that incipient rusting or pitting which may by chance occur in spots beneath the film does not break the same nor cause it to scale off. This composition is further desirable and advantageous by reason of its low cost, the staple character of the ingredients which makes them readily procurable in any quantity, and the comparative ease with which they may be blended.

My coating composition compounded as before mentioned may be satisfactorily used as a paint. I prefer however to mix with it a pigment or filler in order to lend color and body to the coating, and also because in this way I may further improve its rust-inhibiting properties. My preferred material for this purpose is the ferruginous substance sold under the name of "burnt umber". The proportion employed is entirely at the option of the user, being varied according to the color desired and the permissible viscosity or "thickness" of the paint. This burnt umber readily blends with my composition in the proportion useful for painting purposes, and forms a valuable ingredient in that it appears in itself to have the property of inhibiting rust.

While I have particularly described the constitution of my improved composition, the proportions of the ingredients, and the preferred manner of combining them, it is to be understood that such description is illustrative only, and for the purpose of making my invention more clear, and that I do not regard the invention as limited to these exact proportions, nor to the method of combining the ingredients, nor to the use of the composition as a paint for any particular purpose, except in so far as I have included such limitations within the terms of the following claims, in which it is my intention to claim all novelty inherent in my invention as broadly as possible, in view of the prior art.

What I claim as new and desire to secure by Letters Patent is—

1. A coating composition the vehicle of which consists substantially of glucose and linseed oil.

2. A coating composition comprising glucose and linseed oil combined with a pigment.

3. A coating composition comprising glucose and linseed oil combined with a filler.

4. A coating composition comprising more than 50% of linseed oil and less than 50% of glucose.

5. A coating composition consisting of a vehicle containing more than 50% linseed oil and less than 50% glucose, and a pigment.

6. A coating composition consisting of a vehicle containing more than 50% linseed oil and less than 50% glucose and a filler.

7. A coating composition the vehicle of which consists substantially of boiled linseed oil and glucose.

8. A coating composition comprising more than 50% of boiled linseed oil and less than 50% of glucose blended to form a homogeneous mixture.

9. A coating composition comprising glucose, linseed oil, and a ferruginous filler and pigment.

10. A coating composition comprising glucose, linseed oil and burnt umber.

11. A coating composition comprising glucose and linseed oil in substantially the proportion specified.

12. A coating composition comprising glucose and boiled linseed oil in substantially the proportion specified together with a filler or pigment composed mainly of burnt umber.

GEORGE CLEVELAND HICKS.

In presence of—
A. C. Fischer,
D. C. Thorsen.

Copies of this patent may be obtained for five cents each, by addressing the "Commissioner of Patents, Washington, D. C."